(12) United States Patent
Bollhoefer et al.

(10) Patent No.: US 7,234,135 B2
(45) Date of Patent: Jun. 19, 2007

(54) METHOD FOR PROCESSING DATA USING EXTERNAL AND INTERNAL IDENTIFIERS TO PROVIDE RELIABLE ACCESS TO THE DATA EVEN WHEN RECONFIGURATIONS OF THE DATA OCCUR, AND ASSOCIATED SYSTEM

(75) Inventors: Wilhelm Bollhoefer, Ruelzheim (DE); Michael Dreher, Leonberg (DE); Juergen Laforsch, Buehl (DE)

(73) Assignee: Siemens Aktiengesellschaft, Munich (DE)

( * ) Notice: Subject to any disclaimer, the term of this patent is extended or adjusted under 35 U.S.C. 154(b) by 495 days.

(21) Appl. No.: 10/749,383

(22) Filed: Jan. 2, 2004

(65) Prior Publication Data

US 2004/0225378 A1    Nov. 11, 2004

Related U.S. Application Data

(63) Continuation of application No. PCT/DE02/02404, filed on Jul. 2, 2002.

(30) Foreign Application Priority Data

Jul. 2, 2001    (DE)    ................................ 101 31 944

(51) Int. Cl.
G06F 9/45    (2006.01)
(52) U.S. Cl. ........................ 717/154; 717/161; 717/108
(58) Field of Classification Search ................ 717/154, 717/159, 161, 108
See application file for complete search history.

(56) References Cited

U.S. PATENT DOCUMENTS 5,539,909 A * 7/1996 Tanaka et al. ............... 719/315
5,696,759 A * 12/1997 Tomonaga et al. .......... 370/244
5,734,903 A * 3/1998 Saulpaugh et al. ......... 719/316
6,317,796 B1 * 11/2001 Bak et al. .................... 719/315
6,385,660 B2 * 5/2002 Griesemer et al. .......... 719/315

FOREIGN PATENT DOCUMENTS

EP    0 794 493 A    9/1997

OTHER PUBLICATIONS

Workflow Template Process Template Using the WFT Development Environment (ENV) Template Software, 1998, Chapters 1-2 and 9.*
Workflow Template Process Template Developing a WFT System (WFT) Template Software, 1998, Chapters 1-9.*
Object-Oriented Information Systems Planning and Implementation, by David A. Taylor, published Apr. 10, 1992, pp. 49-56.*
Inside CORBA Distributed Object Standards and Applications, by Thomas J. Mowbray et al, 1997, pp. 249-250.*

* cited by examiner

Primary Examiner—Todd Ingberg
(74) Attorney, Agent, or Firm—Sughrue Mion, PLLC

(57) ABSTRACT

A method for processing data in a data processing system (1) which includes a number of data processing units (2), and operator and observation units (4), which are interconnected by way of a data transmission unit (6), whereby a respective data processing program (8) with corresponding function modules (FB1 to FBn) and data modules (DB 1 to DBn) is implemented in the data processing units (2). At least one identifier (K, KE, KI) for the function modules and data modules is stored in a respective conversion table (10) belonging to each data processing unit (2). When an external data processing unit (2) accesses a data module (DB1 to DBn) and/or a function module (FB1 to FBn) of another data processing unit (2), a conversion table (10) mediates by using an external identifier (KE) that characterizes the access and verifies whether a matching internal identifier (KI) is stored for the particular external identifier (KE).

13 Claims, 3 Drawing Sheets

| FB1 bis FBn  K | DB1 bis DBn | Z, Zg |
|---|---|---|
| 32811 | DB100 | 23.02.2001 |
| 32812 | DB200 | 23.02.2001 |
| 50000 | FB1 | 23.02.2001 |
| | | Zg = 23.02.2001 |

| FB1 bis FBn  K | DB1 bis DBn | Z, Zg |
|---|---|---|
| | DB100 | 24.02.2001 |
| 32812 | DB200 | 23.02.2001 |
| 50002 | FB1 | 24.02.2001 |
| 50010 | FB10 | 24.02.2001 |
| | | Zg = 24.02.2001 |

FIG 2

METHOD FOR PROCESSING DATA USING EXTERNAL AND INTERNAL IDENTIFIERS TO PROVIDE RELIABLE ACCESS TO THE DATA EVEN WHEN RECONFIGURATIONS OF THE DATA OCCUR, AND ASSOCIATED SYSTEM

This is a Continuation of International Application PCT/DE02/02404, with an international filing date of Jul. 2, 2002, which was published under PCT Article 21(2) in German, and the disclosure of which is incorporated into this application by reference.

FIELD OF AND BACKGROUND OF THE INVENTION

This invention generally relates to a method for processing data in a data processing system, e.g., in a programmable controller for automation of an industrial installation. More particularly, the invention relates to a method for processing data in a data processing system within a machine, a manufacturing plant, a process engineering plant or a power plant. The invention also relates to an associated data processing system.

Data processing systems are used in a variety of ways within the context of industrial automation processes. For example, they are used where complex industrial installations combine a plurality of data processing units into complex computer networks and data networks via at least one data transmission unit. For operation and/or observation of the data processing units controlling the installation, usually so-called operator stations or operation and observation units are provided. For controlling and/or regulating the industrial installation, each data processing unit includes data processing programs.

A data processing program usually includes, for example, an operating program, a main program, or a main routine, in which a number of control commands and/or data processing commands for the industrial installation are processed sequentially. Such a data processing program for an automated industrial installation having a user-specific design, such as a manufacturing plant, a machine tool or a measurement system, is also referred to as user software. From this main program, so-called subroutines or function modules are retrieved as needed, e.g., cyclically or by an event-triggered system. These function modules are modules which take over certain self-contained control functions and/or regulating functions. The main program accesses individual function modules which are stored, for example, in separate executable data files. In addition, the main program, subroutines or function modules access data that is provided as needed, e.g., via data memory modules (or simply data modules).

The data processing program usually runs in the data processing units, e.g., in a central control unit and in the centralized onsite controls of the industrial installation, and it controls, among other things, the exchange of data between the central control unit and components of the industrial installation. Switching commands or manipulated variables are transmitted by the data processing program to the components on the one hand, while on the other hand measured data or characteristic process parameters and/or control parameters are read from the components. Depending on the type and design of the industrial installation, one data processing unit may also access the data processing program, in particular a function module and/or data module, of another data processing unit.

Due to changes in the process sequence, it may become necessary to adapt, and thus make changes to, the function modules or data modules of the data processing programs of individual data processing units or a plurality of data processing units and/or operator and observation units during the manufacture of such user-specific data processing programs or during ongoing operation of the installation. These program-specific changes may result in so-called specification errors, which may under some circumstances result in failure of individual data processing units or even the entire data processing system. Such a specification error may also be relevant for plant safety on the whole and may thus lead to failure of the entire production installation.

A specification error occurs, for example, when an object, i.e., a function module or a data module or a data processing unit, is altered, i.e., redesigned, but this change in the object does not take place simultaneously within all the data processing units in question. In other words, a change in a function module or a data module leads to changes in the data processing program of the data processing unit affected as well as changes in the data processing program of other data processing units that are exchanging data with the respective data processing unit. Since updating all relevant data processing units does not occur simultaneously, incompatibilities may occur among them. These incompatibilities may result in, for example, an access error in the processing of the data processing programs that have not yet been altered. Such an access error will cause a failure in this data processing unit or a failure of or a disturbance in the production plant controlled by the data processing unit.

OBJECTS OF THE INVENTION

Therefore, one object of the invention described herein is to provide a method of processing data that will operate reliably even with frequent redesign and will thus permit consistent operation of a plurality of data processing units.

SUMMARY OF THE INVENTION

The above and other objects are achieved, according to one formulation of this invention, by a method for processing data of a data processing system including a plurality of data processing units and operator and observation units which are interconnected via a data transmission unit, a data processing program with the respective function modules and data modules being implemented in each of the data processing units, at least one identifier for each module being stored in a conversion table belonging to the respective data processing unit, whereby when an external data processing unit accesses a data module and/or function module of another data processing unit, the conversion table is interposed in such a way that retrieval of the respective data module and/or function module is performed on the basis of the external data processing unit, using an external identifier which characterizes this access, the external identifier is converted by the conversion table into an internal identifier which is saved for this external identifier, and when there is an internal identifier to match the particular external identifier, processing of the data module and/or function module of the respective data processing unit is executed; otherwise the module is not processed.

This invention is based, inter alia, on the idea that particularly reliable access of one data processing unit to another data processing unit should be possible even when there is a change in a function module or a data bus of an individual data processing program or computer program. In particular, the fact that a redesign has occurred should be recognized when starting up the data processing unit or during ongoing operation. Therefore, a conversion table is interposed in the manner of a novel protective function in accessing a stored data module or function module, e.g., in the operating system implemented in the CPU of the respective data processing unit when a corresponding inquiry originates from an external module that is to be secured and is part of another data processing unit. An identifier is stored in the conversion table in the manner of a list of names; an external identifier for the relevant data module or function module, the identifier being intended for communication with the external application or data processing unit, is compared with an identifier used within the operating system for this data module or function module.

In other words, when an external data processing unit or external user module accesses the respective data module or function module, it must provide an "external identifier." This external identifier is first converted on the basis of the conversion table into an "operational system-internal identifier" ("internal identifier"). If a corresponding internal identifier is stored in the conversion table for the required external identifier, access to the respective data module or function module is made possible or enabled under this internal identifier. However, if this is not the case, and no corresponding internal identifier is located, an error message is sent back to the inquiring external data processing unit. By comparing the external identifier with the internal identifier from the standpoint of whether the object to be processed, and thus the data processing program, are based on the same or an altered specification, the compatibility of the two data processing units for the particular object, i.e., for the data module or the function module, is ascertained.

If the specifications are identical, the object is processed. If necessary, corresponding status information may be set, e.g., "specification OK." If the specifications are not identical, a status information such as "specification error" may be set, accordingly. Thus, through parallel use of the internal and external identifiers for processing the particular data module or function module, it is ensured that data processing programs or subprograms accessing one another are not addressed anew each time there is an update of the particular data modules or function modules, because in this case both the actual data module or function module and the data processing program accessing the data or function module are updated in synchronization and in a self-consistent manner.

In other words, in the case of an update to the data or function modules, first the respective data module or function module is modified, but on the other hand the identifier of the subprogram accessing the module is also updated at the same time. Thus, the possibility of a transmission error due to differing data formats or specifications is also ruled-out while retaining the internal identifier previously used for this data module or function module. Such a transmission error can thus occur only in the case of a data processing unit accessing the particular data module or function module externally if this is not yet updated and thus an incorrect or outdated data format is expected as the response. Due to the fact that the old internal identifier is retained, documentation of changes is facilitated. This ensures that unprotected external data processing units can still optionally access the particular data module or function module without updating all the external data processing units. In addition, individual data processing units may also be updated as decentralized or mobile units, e.g., onsite. In particular, a redesign during ongoing operation is made possible here, the redesign pertaining only to those data processing units that are in fact to be modified.

Alternatively, or additionally, the particular identifier is stored in the respective data module and/or function module, in particular in the so-called header. The conversion table is expediently updated whenever there is a change in an object, i.e., the function module and/or the data module. In an update of the conversion table, preferably a change notice is sent to the data processing unit and/or operator and observation unit affected by the update. This ensures that, in the event of a change in a function module or data module and the resulting change in the conversion table, a corresponding notice will be provided to a number of external data processing units logged-on or provided specifically for this purpose. To this end, the particular external data processing unit is advantageously registered as the intended recipient of the notice.

Each update of the conversion table is expediently provided with a respective version identifier, in particular a respective time stamp, which is stored to the conversion table itself. Therefore, any change in the conversion table is provided with a time stamp that is characteristic of the conversion table as such. This time stamp thus represents the latest change in the conversion table. Alternatively or additionally, the particular stored identifier and the particular stored time stamp are queried and updated when starting operation of the data processing unit and/or the operator unit and observation unit. Depending on the design and implementation of the data processing system, plausibility checks may be performed during startup of the respective data processing unit so that a check is performed by means of a query to determine whether all the required data modules or function modules are included in the function table, for example, and are thus available for access by an external data processing unit. In addition, a query may be issued regarding a time stamp characterizing the latest change in the particular data module or function module or the time stamp of the conversion table.

A data processing system is expediently provided, having a plurality of data processing units and operator and observation units that are interconnected via a data transmission unit. Data processing programs that depend on the particular update status are implemented on the data processing units, and a conversion table is provided for assigning an identifier representing the change in the object. In particular, an internal identifier and an external identifier are provided, and if necessary, a special means is provided for determining and assigning a time stamp which determines the point in time of the change; and in the case of processing the object of the respective data processing unit by another data processing unit and/or by an operator unit and observation unit, an analysis module is provided for comparing the internal identifier with the external identifier. If the identifiers are the same, regular processing of the object is executed, otherwise the object is not processed.

Comparison of the internal identifier with the external identifier is first performed by the analysis module. Second, the analysis module updates the identifier and, if necessary, updates the respective version identifier or the respective time stamp in order to monitor the consistency of the data processing programs of all the data processing units and/or operator and observation units of the data processing system.

The advantages achieved with the present invention consist in particular of the fact that only objects based on one and the same specification are processed due to a comparison of the requisite external identifier characterizing an object with the internal identifier stored for this object. Therefore, the compatibility of the request received from another data processing unit for an object to be processed in another data processing unit is identifiable on the basis of the comparison of the internal identifier with the external identifier.

Consequently, this prevents most failures in the data processing units due to faulty access. A data processing system having such a design is thus suitable for consistent maintenance in particular and is particularly effective and economical in regard to availability as well as its use as an automation system in safety-relevant installations.

Interposing a conversion table is also suitable in particular for the case when a subset of available module numbers, e.g., all numbers >32 k, are designed only for limited access. In this case, it is possible to work in an application program with freely available module numbers, e.g., module numbers <32 k, which are transformed by the conversion table to the confirmed module numbers >32 k for secure data access in the automation device. Thus, a retransformation can take place in the automation device by means of the conversion table stored therein.

BRIEF DESCRIPTION OF THE DRAWINGS

Exemplary embodiments of this invention are explained in greater detail now on the basis of the embodiments depicted in the figures, in which:

FIG. 2 shows schematically a data memory for storing of the revision code number.

Corresponding parts in the FIGS. 1 and 2 are labeled with the same reference notation.

DETAILED DESCRIPTION OF THE PREFERRED EMBODIMENTS

Figure 1:
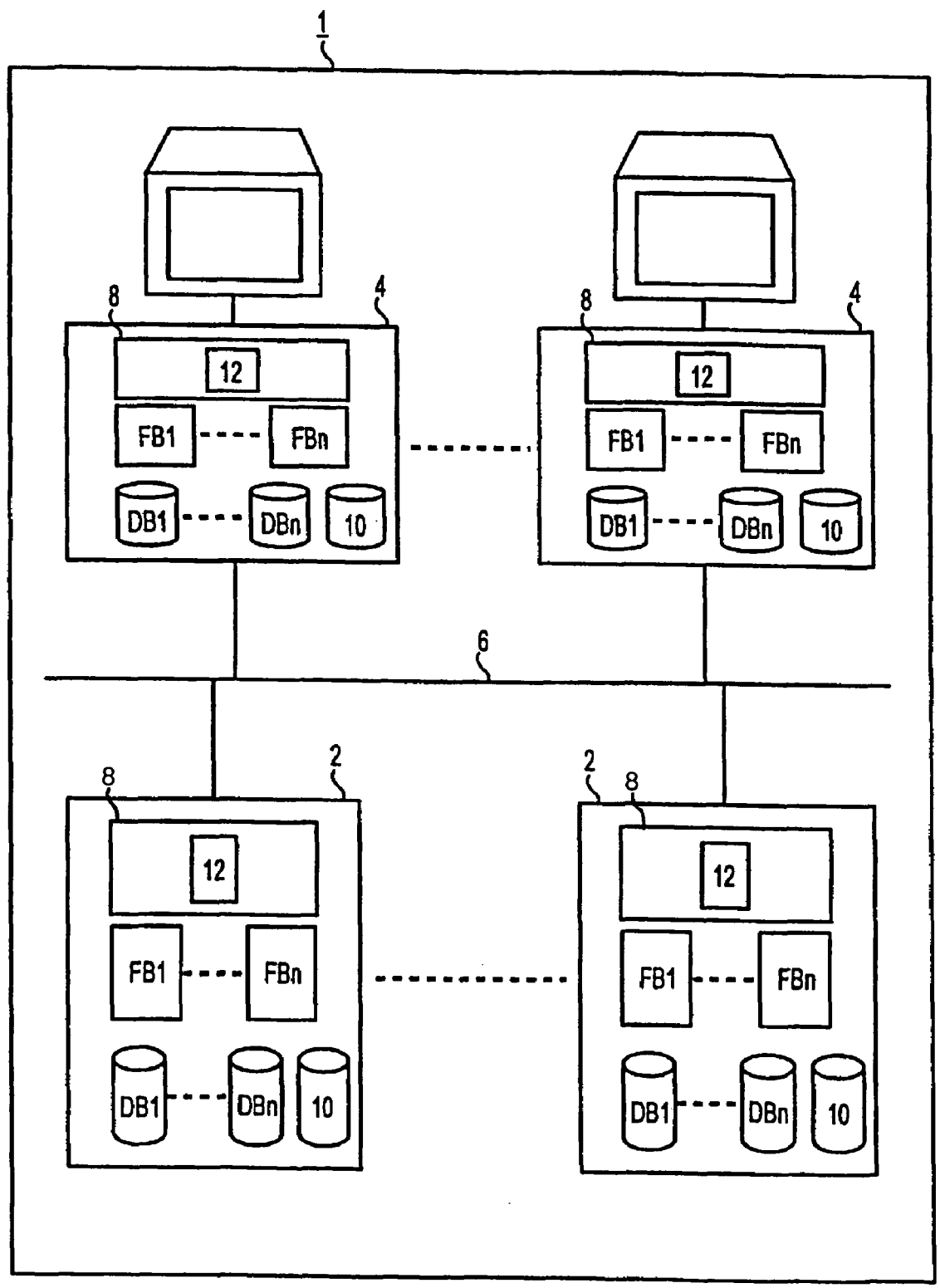
FIG. 1 shows schematically a data processing system having a plurality of data processing units and operator and observation units.

FIG. 1 shows a data processing system 1 having a plurality of data processing units 2 and a plurality of operator and observation units 4 which are interconnected via a data transmission unit 6. For example, a programmable controller, a personal computer or some other data processing unit may be used as the data processing unit 2. For example, a personal computer or a workstation may serve as the operator and observation unit 4. The data transmission unit 6 is a standardized transmission line, e.g., an Ethernet coaxial cable, and also has standardized transmission elements (not shown) such as amplifiers, repeaters or bridges. The data processing units 2 and the operator and observation units 4 are connected to a computer network via the data transmission unit 6.

Computer programs or data processing programs 8 are implemented on each data processing unit 2 and on each operator and observation unit 4; an industrial plant, e.g., a manufacturing plant or a machine tool, is controlled and/or monitored by means of these programs. The data processing program 8, also called the main program or user software, runs in the data processing unit 2 for controlling and/or detecting inputs and/or outputs of respective peripheral modules (not shown). The data processing program 8 of the operator and observation unit serves to operate and observe the inputs and/or outputs and/or the data processing programs 8 of the data processing units 2. The respective data processing program 8 has a modular design and includes a plurality of function modules FB1 through FBn as objects, which take over self-contained control and/or regulation functions for the industrial installation. In addition, a plurality of data memory modules DB1 through DBn (referred to below simply as data modules) is provided as additional objects for storing and/or archiving static and/or dynamic data. The data modules DB1 through DBn include, for example, static memories, also known as read-only memories (ROM) or dynamic memories, also known as read-write memories or random-access memories (RAM). Fixed parameterization data of the software and/or hardware of the data processing system 1 is stored in the permanent memories. For example, the instantaneously acquired data of the inputs and/or outputs of peripheral modules is stored in the dynamic memories.

Depending on the type and version of the data processing system 1, there is an exchange of data, e.g., input/output data and control data, among the data processing units 2 as well as between the data processing units 2 and the operator units and observation units 4. For example, there is access from one data processing unit 2 to the data module DB1 and/or function module FB1 of another data processing unit 2. Therefore, the data modules DB1 through DBn as well as the function modules FB1 through FBn are labeled on the basis of continuous numbering, for example.

In addition, a dynamic data memory, also called a conversion table 10, is designed for storing at least one identifier K for objects, i.e., for function modules FB1 through FBn and/or data modules DB1 through DBn. The dynamic data memory may likewise be designed as a data module. An internal identifier KI and/or an external identifier KE is stored as the identifier K for the respective data module DB1 through DBn and/or the function module FB1 through FBn. The external identifier KE represents the identifier K by means of which an external data processing unit 2 accesses another data processing unit 2 with a conversion table 10 interposed. The conversion table 10 serves as a safety function for the respective data processing unit 2 such that the external identifier KE of the external data processing unit 2 is converted to a respective internal identifier KI before accessing the respective object. If a corresponding internal identifier KI is stored for the requested external identifier KE, then access of the external data processing unit 2 to the respective object is made possible or enabled by means of the internal identifier KI. For such balancing of the particular external identifier KE with the internal identifier KI, each data processing unit 2 and each operator and observation unit 4 include a respective analysis module 12.

Depending on the type and embodiment, the conversion table 10 is designed as a table like the one depicted in the upper portion of FIG. 2 as an example. The conversion table 10 represents the update status for a prior change in the identifier K and thus for a redesign. The conversion table 10' in the lower portion of FIG. 2 represents the updated conversion table 10 and thus the update status for a subsequent change in the identifier KE, KI of at least one of the objects, i.e., one of the data modules DB or one of the function modules FB. For a determination of a time stamp Z representing the point in time of a change, the conversion table 10, 10' includes a time stamp Z pertaining to the respective object and thus describing the point in time of the last update. Depending on the type and design of the data processing units 2 and/or the operator and observation units 4, the respective conversion table 10 includes the last change in one of the objects and thus a time stamp Zg representing the identifiers KE, KI together and/or a respective time stamp Z for each object.

In creating the data processing program 8, in particular in expanding or revising the data processing program 8 for control functions and/or regulating functions on the basis of the function modules FB1 through FBn and/or the data modules DB1 through DBn, it is important to know which hardware and/or software addresses are occupied or free or have been altered by the peripheral modules and/or the data processing program 8 and which memory areas are occupied or free or have been altered by the data memories DB1 through DBn in order to avoid inconsistencies between the units exchanging information.

When there is a change in one of the objects, e.g., a change in a function of a function module FB1 through FBn, in deletion of a data module DB1 through DBn or addition of a new data module DB1 through DBn in one of the data processing units 2 and/or in one of the operator and observation units 4, a new object designation or external identifier KE which characterizes the change is assigned to the respective object and is stored in the conversion table 10, 10'. Each data processing unit 2 and operator and observation unit 4 therefore has a means for assigning the relevant external identifier KE. This means is preferably designed as a function module FB which executes and/or updates this function with each change and/or with a new start of the respective unit.

Another means which is designed as a function module FB is provided for determining the time stamp Z, which identifies the point in time of the change. By means of an external function module, e.g., another time-relevant function module stored in a design device, the respective external identifier K is provided with a time stamp Z, which identifies the point in time of the change. For example, all objects, i.e., data modules DB100, DB200 and function module FB1 which were changed on Feb. 23, 2001 during a so-called revision or redesign will bear the time stamp Z="2.23.2001" and a respective external identifier KE which is necessary for external requests, i.e., 32811, 32812 or 50000 which are stored in the conversion table 10. The respective internal identifier KI does not change.

As shown on the basis of the conversion table 10', which represents the next change or revision, the internal identifier KI is also deleted for objects that have been deleted such as data module DB100 ("explicit deletion"). The entry in this regard, i.e., the line in question, can also be removed from the conversion table 10'. Altered objects such as function module FB1 receive a new external identifier KE representing the change with KE=50002 with the existing numbering of the function module number and thus with the existing internal identifier KI. Then the old external identifier KE=50000 for the function module FB1 is deleted ("implicit deletion"). The new external identifier KE representing the function module FB1 receives a continuous number in the case of free numbers and when the total numbers have been exhausted, the external identifier KE receives a number that has already been deleted and is no longer being used.

Newly added objects such as the function module FB10 are incorporated into the ongoing numbering, depending on the allocation of numbers already issued, if all the numbers for the external identifier KE have already been issued, or if numbers are still free, the external identifier KE is numbered continuously with K=50010. A similar procedure is followed with each additional change or redesign.

A change in the four objects, i.e., data modules DB100, DB200 and function modules FB1, FB10 in the respective data processing unit 2, is sent via a change message to the other external data processing units 2 and/or operator and observation units 4 processing these objects DB100, DB200, FB1, FB10. Then the respective conversion table 10, 10' is updated in the external data processing units 2 and/or operator and observation units 4. If one of the other data processing units 2 and/or operator and observation units 4 is turned off at this point in time, the update of the identifier K, KE, KI stored in the respective conversion table 10, 10' and the update in the time stamp Z are performed at the next startup of operation.

In operation of the data processing system 1, large volumes of data in the form of control commands and/or status messages and interference messages, also referred to as signals S below, are transmitted between the data processing units 2 and/or the operator and observation units 4 via the data transmission unit 6. In doing so, the signals are processed internally by access of the external data processing unit 2 to a function module FB or a data module DB of the other data processing unit 2. If all the data processing units 2 and/or operator and observation units 4 are not updated at the same time and with the resulting difference in specifications, there may be incompatibilities in the external data processing unit 2 and/or operator and observation unit 4 gaining access to the respective function module FB or data module DB of the other data processing unit 2 or operator and observation unit 4. This then leads to possibly safety-relevant instabilities or access errors in processing the data processing programs 8 of the "internal" data processing unit 2. To avoid a resulting failure of the respective data processing unit 2 or operator and observation unit 4, which has not yet been updated, for example, each data processing unit 2 or operator and observation unit 4 would also include the analysis module 12.

When there is a request for processing the object FB1 or DB100 of the respective data processing unit 2 and thus there is access through an external data processing unit 2 and/or operator and observation unit 4, the conversion table 10 is connected in between by means of the analysis module 12 so that a retrieval of the respective data module DB100 and/or function module FB1 is executed on the basis of the external data processing unit 2 using an external identifier KE which characterizes this access, the external identifier KE being converted by the conversion table 10 into an internal identifier KI which is stored for this external identifier KE. When the internal identifier KI for the respective external identifier KE is present, the data module DB100 and/or function module FB1 of the respective data processing unit 2 is processed; otherwise, it is not processed. In other words, when the internal identifier KI is the same as the requesting external identifier KE, i.e., the specifications of the two data processing units 2 and/or operator and observation units 4 communicating with one another are the same, regular processing of the object is executed; otherwise there is no processing. Depending on the type and execution, a corresponding status information or change message may be sent to the operator, e.g., "specification OK" when they are the same or "specification error" when they are not the same.

Alternatively or additionally, the compatibility of objects of the data processing programs 8 between communicating data processing units 2 and/or operator and observation units 4 can be checked on the basis of a comparison of the relevant time stamp Z or the total time stamp Zg. When there is a deviation between the time stamps Z and Zg, a change or redesign has occurred in the meantime and an error message may be displayed to the operator; otherwise, the processing is executed. The consistency of all relevant objects can be checked in startup by simply analyzing a single time stamp Z or Zg. Such a consistency check is also made possible by readout of the conversion table 10.

Figure 3:
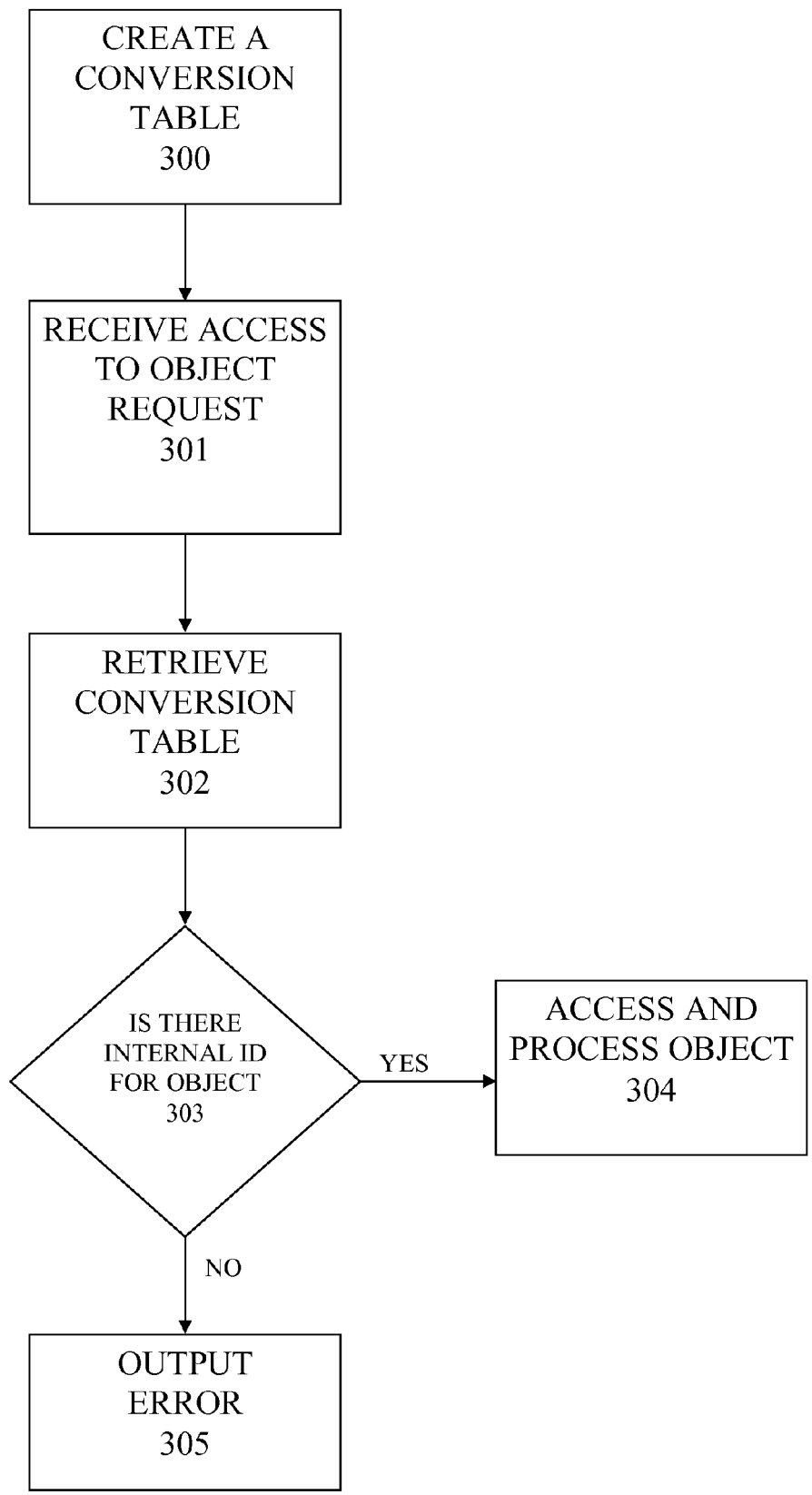
FIG. 3 is a flow chart illustrating operations of the method of processing data according to an exemplary embodiment of the present invention.

For example, as depicted in FIG. 3, a conversion table is created or generated in operation 300. Next, a request to access an object is received in operation 301. In operation 302, the generated or created conversion table is retrieved. Next, in operation 303, a check is performed to determine if there is an internal identifier for the object. When the internal identifier for the object is present, the object is accessed in operation 304. Otherwise, an error is output in operation 305.

The advantages achieved with this invention consist in particular of the fact that by monitoring the changes in specification in the individual data processing units 2 and/or operator and observation units 4 of the data processing system 1, it is possible to ensure consistent, incremental and transparent maintenance of the data processing programs 8. By processing objects when the identifiers are the same and not processing them when they are not the same, this ensures that signals or functions which are exchanged between two units can be changed or deleted first only in one of the units, and a failure of the respective unit is reliably prevented.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for processing data in a data processing system where the system comprises at least one of a plurality of data processing units and a plurality of operator and observation units, all of which are interconnected via a data transmission unit, wherein a respective data processing program with associated function modules and data modules is implemented on each of the data processing units, the method comprising:
    storing at least one identifier for each module in a conversion table belonging to the respective data processing unit;
    enabling a first data processing unit from among the plurality of data processing units to access a data module or a function module of a different, second, data processing unit by providing the conversion table in such a way that retrieval of the respective data module or function module is performed on the basis of the first data processing unit using an external identifier which characterizes the access;
    determining whether the conversion table includes an internal identifier corresponding to the external identifier;
    processing the data module or the function module of the respective data processing unit if a corresponding internal identifier is included in the conversion table for the respective external identifier;
    leaving the data module or the function module of the respective data processing unit unprocessed if a corresponding internal identifier is not included in the conversion table for the respective external identifier; and
    outputting a status information message indicating whether the data module or the function module of the respective data processing unit has been processed,
    wherein said storing comprises assigning an external identifier for each module that has been changed by linking new external identifier to the internal identifier of a respective module, and storing the new assigned external identifier in the conversion table while deleting a link to the internal identifier for an old external identifier of the respective module.

2. A method as claimed in claim 1, wherein the at least one stored identifier is stored in the respective data module or function module.

3. A method as claimed in claim 1, further comprising:
    updating the conversion table when there is a change in the function module or in the data module.

4. A method as claimed in claim 3, further comprising:
    sending a change message to the data processing unit or the operator and observation unit relevant to the update whenever the conversion table is updated.

5. A method as claimed in claim 3, wherein each update of the conversion table comprises a respective time stamp or a version identifier.

6. A method as claimed in claim 5, wherein during a startup of the data processing unit or the operator and observation unit, the respective time stamp saved is queried and updated.

7. The method as claimed in claim 1, wherein the external identifier represents an identifier of an object by which an external data processing unit can access another processing unit with the conversion table being interposed therein between.

8. The method of claim 1, wherein the data processing units are components of an industrial installation.

9. A method for processing data of a data processing system that includes a plurality of data processing units interconnected via a data transmission unit, wherein each data processing unit has a data processing program with program modules, wherein at least one respective identifier for each of the modules is stored for a respective one of the data processing units, comprising:
    supplying an external identifier from a sending data processing unit, to access a program module of a receiving data processing unit;
    converting the external identifier into an internal identifier of the receiving data processing unit;
    comparing the converted internal identifier with other internal identifiers of the receiving data processing unit;
    enabling the access to the program module of the receiving data processing unit only if the converted internal identifier corresponds with another of the internal identifiers of the receiving data processing unit; and
    outputting a status information message indicating whether the data module or the function module of the respective data processing unit has been processed,
    wherein said supplying of the external identifier comprises assigning the external identifier for each module that has been changed by linking the new external identifier to the internal identifier of a respective module, and storing the new assigned external identifier in the conversion table while deleting a link to the internal identifier for an old external identifier of the respective module.

10. A data processing system, comprising:
    a plurality of data processing units;
    a transmission link interconnecting the data transmission units; and
    at least one component configured to receive an identifier from one of the data processing units in order to access a module of another of the data processing units, to convert the identifier into a converted identifier, to compare the converted identifier with other identifiers of the other data processing unit, and to enable the access to the program module of the other data processing unit only if the converted identifier corresponds with another of the identifiers of the other data processing unit, wherein the external identifier is assigned by the at least one component for each module that has been changed by linking the new external identifier to the internal identifier of a respective module while deleting a link to the internal identifier for an old external identifier of the respective module.

11. The data processing system according to claim 10, wherein the component is incorporated into the other data processing unit.

12. The data processing system according to claim 11, wherein each of the data processing units comprises a respective one of the components.

13. The data processing system according to claim 10, wherein the component comprises a conversion table converting the identifier into the converted identifier and an analysis module enabling the access to the program module based on a result of the comparison.

* * * * *